(12) United States Patent  (10) Patent No.: US 8,530,030 B2
Noguchi et al.  (45) Date of Patent: Sep. 10, 2013

(54) HONEYCOMB STRUCTURE

(75) Inventors: Yasushi Noguchi, Nagoya (JP); Atsushi Kaneda, Ichinomiya (JP); Takayuki Inoue, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/432,322

(22) Filed: Mar. 28, 2012

(65) Prior Publication Data

US 2012/0183725 A1 Jul. 19, 2012

Related U.S. Application Data

(63) Continuation of application No. PCT/JP2010/066779, filed on Sep. 28, 2010.

(30) Foreign Application Priority Data

Sep. 28, 2009 (JP) ................................. 2009-222538

(51) Int. Cl.
  *F01N 3/10* (2006.01)
  *F01N 3/24* (2006.01)
  *B01D 53/94* (2006.01)

(52) U.S. Cl.
  USPC ........... 428/116; 219/553; 422/174; 422/180; 428/118; 55/523

(58) Field of Classification Search
  USPC ........................... 428/116; 422/174; 219/553
  See application file for complete search history.

(56) References Cited

U.S. PATENT DOCUMENTS

| | | | |
|---|---|---|---|
| 3,995,143 A * | 11/1976 | Hervert | 428/116 |
| 5,063,029 A | 11/1991 | Mizuno et al. | |
| 5,288,975 A | 2/1994 | Kondo | |
| RE35,134 E | 12/1995 | Mizuno et al. | |
| 2003/0134084 A1 * | 7/2003 | Ichikawa et al. | 428/116 |
| 2004/0097370 A1 | 5/2004 | Ichikawa et al. | |
| 2005/0214504 A1 | 9/2005 | Yoshida | |
| 2005/0235621 A1 | 10/2005 | Kunieda et al. | |

(Continued)

FOREIGN PATENT DOCUMENTS

| | | |
|---|---|---|
| JP | 2931362 B2 | 8/1999 |
| JP | 2002-201082 A1 | 7/2002 |

(Continued)

OTHER PUBLICATIONS

U.S. Appl. No. 13/440,148, filed Apr. 5, 2012, Noguchi et al.

(Continued)

*Primary Examiner* — David Sample
*Assistant Examiner* — Nicholas W Jordan
(74) *Attorney, Agent, or Firm* — Burr & Brown

(57) ABSTRACT

There is disclosed a honeycomb structure including a honeycomb structure section including: porous partition walls to divide and form a plurality of cells which extend from one end surface to the other end surface and become through channels of a fluid; and an outer peripheral wall positioned in an outermost periphery. The partition walls and the outer peripheral wall contain silicon carbide particles as an aggregate, and silicon as a binder to bind the silicon carbide particles, thicknesses of the partition walls are from 50 to 200 μm, a cell density is from 50 to 150 cells/cm$^2$, an average particle diameter of silicon carbide as the aggregate is from 3 to 40 μm, and a volume resistivity at 400° C. is from 1 to 40 Ωcm.

15 Claims, 1 Drawing Sheet

(56) References Cited

U.S. PATENT DOCUMENTS

| | | | |
|---|---|---|---|
| 2006/0175741 A1 | 8/2006 | Kawasaki et al. | |
| 2010/0229542 A1* | 9/2010 | Andy et al. | 60/301 |
| 2010/0287916 A1* | 11/2010 | Vernoux et al. | 60/299 |
| 2012/0187109 A1* | 7/2012 | Noguchi et al. | 219/553 |
| 2012/0241439 A1* | 9/2012 | Hashimoto et al. | 219/553 |
| 2012/0248090 A1* | 10/2012 | Furukawa et al. | 219/538 |
| 2013/0036719 A1* | 2/2013 | Noguchi et al. | 55/523 |

FOREIGN PATENT DOCUMENTS

| | | |
|---|---|---|
| JP | 2003-155908 A1 | 5/2003 |
| JP | 4136319 B2 | 8/2008 |
| WO | 2004/031100 A1 | 4/2004 |
| WO | 2004/031101 A1 | 4/2004 |
| WO | 2004/083148 A1 | 9/2004 |

OTHER PUBLICATIONS

International Search Report and Written Opinion dated Jan. 11, 2011.
U.S. Appl. No. 13/628,521, filed Sep. 27, 2012, Sakashita et al.
U.S. Appl. No. 13/628,672, filed Sep. 27, 2012, Sakashita et al.
U.S. Appl. No. 13/628,740, filed Sep. 27, 2012, Sakashita et al.
U.S. Appl. No. 13/591,494, filed Aug. 22, 2012, Noguchi et al.

* cited by examiner

HONEYCOMB STRUCTURE

BACKGROUND OF THE INVENTION

1. Field of the Invention

The present invention relates to a honeycomb structure, and more particularly, it relates to a honeycomb structure whose volume resistivity is in a predetermined range and which is a catalyst support and also functions as a heater.

2. Description of Related Art

Heretofore, a honeycomb structure made of cordierite and including a loaded catalyst has been used in a treatment of a harmful substance in an exhaust gas discharged from a car engine. It is also known that a honeycomb structure formed by a silicon carbide sintered body is used in the purification of the exhaust gas (e.g., see Patent Document 1).

When the exhaust gas is treated by the catalyst loaded onto the honeycomb structure, it is necessary to raise a temperature of the catalyst to a predetermined temperature. However, at the start of an engine, the catalyst temperature is low, and hence there has been a problem that the exhaust gas is not sufficiently purified.

Therefore, a method has been investigated in which a heater made of a metal is installed on an upstream side of a honeycomb structure including a loaded catalyst, to raise a temperature of an exhaust gas (e.g., see Patent Document 2).

PRIOR ART DOCUMENTS

Patent Documents

Patent Document 1: JP4136319
Patent Document 2: JP2931362

When the above heater is mounted on a car and used, a power source for use in an electric system of the car is used in common, and the power source having a high voltage of, for example, 200 V is used. However, the heater made of a metal has a low electric resistance. Therefore, when the power source having a high voltage of 200 V is used, there has been a problem that a current excessively flows, and a power source circuit is damaged sometimes.

Moreover, when the heater is made of the metal and even if the heater is processed in a honeycomb structure, a catalyst is not easily loaded. Therefore, it has been difficult to integrate the heater and the catalyst.

SUMMARY OF THE INVENTION

The present invention has been developed in view of the above problem, and an object thereof is to provide a honeycomb structure whose volume resistivity is in a predetermined range and which is a catalyst support and also functions as a heater.

To solve the above problem, the present invention provides the following honeycomb structure.

According to a first aspect of the present invention, a honeycomb structure is provided, comprising a honeycomb structure section including porous partition walls to divide and form a plurality of cells which extend from one end surface to the other end surface and become through channels of a fluid, and an outer peripheral wall positioned in an outermost periphery, wherein the partition walls and the outer peripheral wall contain silicon carbide particles as an aggregate, and silicon as a binder to bind the silicon carbide particles. Thicknesses of the partition walls are from 50 to 200 µm, a cell density is from 50 to 150 cells/cm², an average particle diameter of the silicon carbide particles as the aggregate is from 3 to 40 µm, and a volume resistivity at 400° C. is from 1 to 40 Ωcm.

According, to a second aspect of the present invention, the honeycomb structure according to the first aspect is provided, wherein a ratio of a mass of silicon as the binder to a total of a mass of the silicon carbide particles as the aggregate and the mass of silicon as the binder is from 10 to 40 mass %.

According to a third aspect of the present invention, the honeycomb structure according to the first or second aspects is provided, wherein porosities of the partition walls are from 30 to 60%, and an average pore diameter of the partition walls is from 2 to 20 µm.

According to a fourth aspect of the present invention, the honeycomb structure according to any one of the first to third aspects is provided, wherein an electric resistance at 400° C. is from 1 to 30 Ω.

According to a fifth aspect of the present invention, the honeycomb structure according to any one of the first to fourth aspects is provided, wherein the thicknesses of the partition walls are from 70 to 130 µm, the cell density is from 70 to 100 cells/cm², the porosities of the partition walls are from 35 to 45%, the average pore diameter of the partition walls is from 10 to 20 µm, the ratio of the mass of silicon as the binder to the total of the mass of the silicon carbide particles as the aggregate and the mass of silicon as the binder is from 15 to 35 mass %, and the volume resistivity at 400° C. is from 10 to 35 Ωcm.

According to a sixth aspect of the present invention, the honeycomb structure according to any one of the first to fifth aspects is provided, wherein a shape of the cells in a cross section orthogonal to an extending direction of the cells is a quadrangular shape or a hexagonal shape.

In the honeycomb structure of the present invention, the volume resistivity at 400° C. is from 1 to 40 Ωcm. Therefore, even when a power source having a high voltage is used so that a current flows, the current does not excessively flow. The honeycomb structure can suitably be used as a heater. Moreover, the partition wall thickness is from 50 to 200 µm. Therefore, even when the honeycomb structure is used as a catalyst support to load a catalyst, a pressure loss when an exhaust gas flows can be prevented from becoming excessively large.

DETAILED DESCRIPTION OF THE INVENTION

Next, modes for carrying out the present invention will be described in detail with reference to the drawings, but it should be understood that the present invention is not limited to the following embodiments, and design changes, improvements and the like can suitably be added on the basis of ordinary knowledge of a person skilled in the art without departing from the scope of the present invention.

Figure 1:
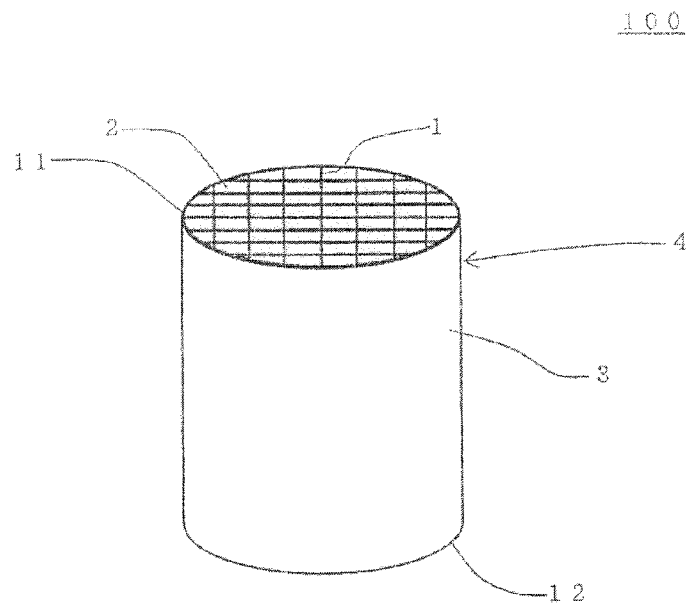
FIG. 1 is a perspective view schematically showing an embodiment of a honeycomb structure of the present invention.
Figure 2:
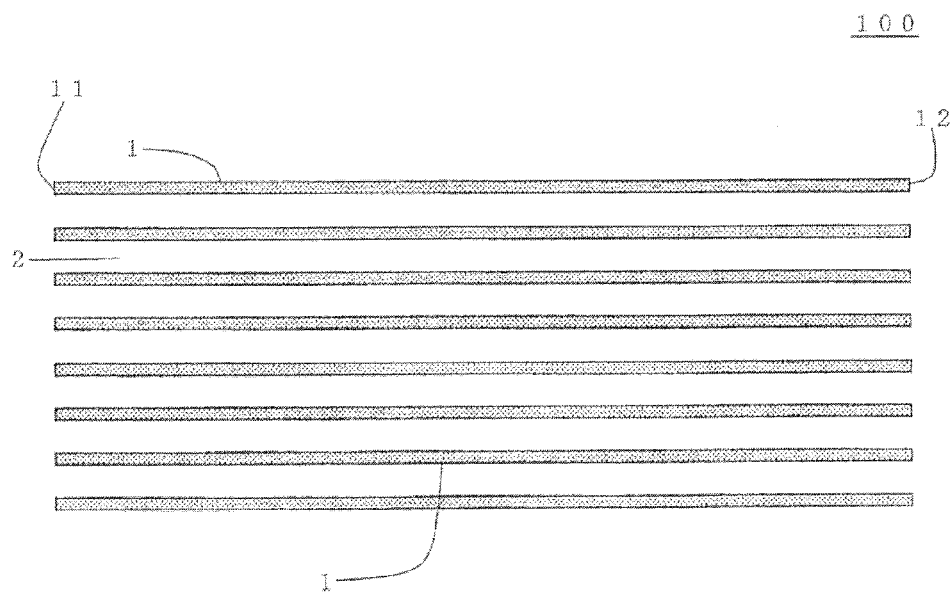
FIG. 2 is a schematic view showing a cross section parallel to a cell extending direction, in the embodiment of the honeycomb structure of the present invention.

(1) Honeycomb Structure:

As shown in FIG. 1 and FIG. 2, an embodiment of a honeycomb structure of the present invention includes a honeycomb structure section 4 including porous partition walls 1 to divide and form a plurality of cells 2 which extend from one end surface 11 to the other end surface 12 and become through channels of a fluid, and an outer peripheral wall 3 positioned in an outermost periphery (disposed to surround the whole outer periphery of the partition walls 1). The partition walls 1 and the outer peripheral wall 3 contain silicon carbide particles (silicon carbide) as an aggregate, and silicon as a binder to bind the silicon carbide particles, thicknesses of the partition walls 1 are from 50 to 200 μm, a cell density is from 50 to 150 cells/cm$^2$, an average particle diameter of silicon carbide as the aggregate is from 3 to 40 μm, and a volume resistivity at 400° C. is from 1 to 40 Ωcm. A honeycomb structure 100 of the present embodiment includes the honeycomb structure section 4. FIG. 1 is a perspective view schematically showing the embodiment of the honeycomb structure of the present invention. FIG. 2 is a schematic view showing a cross section parallel to a cell extending direction, in the embodiment of the honeycomb structure of the present invention.

Thus, in the honeycomb structure 100 of the present embodiment, the volume resistivity at 400° C. is from 1 to 40 Ωcm. Therefore, even when a power source having a high voltage is used so that a current flows, the current does not excessively flow. The honeycomb structure can suitably be used as a heater. Moreover, the partition wall thickness is from 50 to 200 μm. Therefore, even when a catalyst is loaded onto the structure to use the structure as a catalyst support, a pressure loss when an exhaust gas flows can be prevented from becoming excessively large.

In the honeycomb structure 100 of the present embodiment, the partition walls 1 and the outer peripheral wall 3 contain the silicon carbide particles as the aggregate, and silicon as the binder to bind the silicon carbide particles. In the honeycomb structure 100 of the present embodiment, the plurality of silicon carbide particles are bound by silicon so as to form pores among the silicon carbide particles.

A ratio of a mass of silicon as the binder to a total of a mass of the silicon carbide particles as the aggregate and the mass of silicon as the binder is preferably from 10 to 40 mass %, and further preferably from 15 to 35 mass %. When the ratio is lower than 10 mass %, a strength of the honeycomb structure lowers sometimes. When the ratio is higher than 40 mass %, a shape cannot be held at the time of firing.

In the honeycomb structure 100 of the present embodiment, the partition walls 1 and the outer peripheral wall 3 may be formed only of the silicon carbide particles as the aggregate and silicon as the binder to bind the silicon carbide particles, but may contain another substance. Examples of the other substance contained in the partition walls 1 and the outer peripheral wall 3 can include strontium.

Porosities of the partition walls 1 are preferably from 30 to 60%, and further preferably from 35 to 45%. When the porosity is smaller than 30%, deformation at the time of the firing unfavorably becomes large. When the porosity is over 60%, the strength of the honeycomb structure unfavorably lowers. The porosity is a value measured by a mercury porosimeter.

An average pore diameter of the partition walls 1 is preferably from 2 to 20 μm, and further preferably from 10 to 20 μm. When the average pore diameter is smaller than 2 μm, the volume resistivity unfavorably becomes excessively large. When the average pore diameter is larger than 20 μm, the volume resistivity unfavorably becomes excessively small. The average pore diameter is a value measured by the mercury porosimeter.

The average particle diameter of the silicon carbide particles as the aggregate is from 3 to 40 μm, and preferably from 10 to 35 μm. When the average particle diameter is in such a range, the volume resistivity of the honeycomb structure 100 at 400° C. can be from 1 to 40 Ωcm. When the average particle diameter of the silicon carbide particles is smaller than 3 μm, the volume resistivity of the honeycomb structure 100 at 400° C. unfavorably becomes large. When the average particle diameter of the silicon carbide particles is larger than 40 μm, the volume resistivity of the honeycomb structure 100 at 400° C. unfavorably becomes small. Moreover, when the average particle diameter of the silicon carbide particles is larger than 40 μm and a honeycomb formed body is formed by extrusion, a die for the extrusion forming is unfavorably clogged with a forming raw material sometimes. The average particle diameter of the silicon carbide particles is a value measured by a laser diffraction method.

In the honeycomb structure 100 of the present embodiment, the volume resistivity at 400° C. is from 1 to 40 Ωcm, and preferably from 10 to 35 Ωcm. When the volume resistivity at 400° C. is smaller than 1 Ωcm and electricity is conducted through the honeycomb structure 100 by a power source of 200 V, the current unfavorably flows excessively. When the volume resistivity at 400° C. is larger than 40 Ωcm and the electricity is conducted through the honeycomb structure 100 by the power source of 200 V, the current does not easily flow, and heat unfavorably is not sufficiently generated sometimes. The volume resistivity of the honeycomb structure at 400° C. is a value measured by a two-terminals method.

Moreover, an electric resistance of the honeycomb structure 100 at 400° C. is preferably from 1 to 30Ω, and further preferably from 10 to 25Ω. When the electric resistance at 400° C. is smaller than 1Ω and the electricity is conducted through the honeycomb structure 100 by the power source of 200 V, the current unfavorably flows excessively. When the electric resistance at 400° C. is larger than 30Ω and the electricity is conducted through the honeycomb structure 100 by the power source of 200 V, the current unfavorably does not flow easily. The electric resistance of the honeycomb structure at 400° C. is a value measured by the two-terminals method.

In the honeycomb structure 100 of the present embodiment, the partition wall thickness is from 50 to 200 μm, and preferably from 70 to 130 μm. When the partition wall thickness is in such a range and the honeycomb structure 100 is used as the catalyst support to load the catalyst, the pressure loss when the exhaust gas flows can be prevented from becoming excessively large. When the partition wall thickness is smaller than 50 μm, the strength of the honeycomb structure unfavorably lowers. When the partition wall thickness is larger than 200 μm and the honeycomb structure 100 is used as the catalyst support to load the catalyst, the pressure loss when the exhaust gas flows unfavorably becomes large.

Moreover, a thickness of the outer peripheral wall 3 constituting the outermost periphery of the honeycomb structure 100 of the present embodiment is preferably from 0.1 to 2 mm. When the thickness is smaller than 0.1 mm, the strength of the honeycomb structure 100 lowers sometimes. When the thickness is larger than 2 mm, an area of the partition walls onto which the catalyst is loaded becomes small sometimes.

In the honeycomb structure 100 of the present embodiment, the cell density is from 50 to 150 cells/cm$^2$, and preferably from 70 to 100 cells/cm$^2$. When the cell density is in such a range, there is an advantage that the pressure loss when the exhaust gas flows and a purification performance of the catalyst can be balanced. When the cell density is smaller than 50 cells/cm$^2$, a catalyst loading area unfavorably becomes small. When the cell density is larder than 150 cells/cm$^2$ and the honeycomb structure 100 is used as the catalyst support to load the catalyst, the pressure loss when the exhaust gas flows unfavorably becomes large.

In the honeycomb structure 100 of the present embodiment, a shape of the cells 2 in a cross-section orthogonal to the extending direction of the cells 2 is preferably a quadrangular shape or a hexagonal shape. When such a cell shape is used, there are advantages that the pressure loss when the exhaust gas flows is small and that the purification performance of the catalyst is excellent.

There are not any special restrictions on a shape of the honeycomb structure of the present embodiment, and examples of the shape can include a tubular shape with a bottom surface which is circular (a cylindrical shape), a tubular shape with a bottom surface which is oval, and a tubular shape with a bottom surface having a polygonal shape (a quadrangular shape, a pentangular shape, a hexagonal shape, a heptagonal shape, an octagonal shape or the like). Moreover, as to a size of the honeycomb structure when the honeycomb structure is tubular, an area of the bottom surface is preferably from 2000 to 20000 $mm^2$, and further preferably from 4000 to 10000 $mm^2$. Moreover, a length of the honeycomb structure in a central axis direction is preferably from 50 to 200 mm, and further preferably from 75 to 150 mm.

An isostatic strength of the honeycomb structure 100 of the present embodiment is preferably 1 MPa or larger. When the isostatic strength is smaller than 1 MPa and the honeycomb structure is used as the catalyst support or the like, the structure easily breaks sometimes. The isostatic strength is a value measured by applying a hydrostatic pressure into water.

(2) Manufacturing Method of Honeycomb Structure:

Next, a manufacturing method of the embodiment of the honeycomb structure of the present invention will be described.

First, metal silicon (metal silicon powder), a binder, a surfactant, a pore former, water and the like are added to silicon carbide powder (silicon carbide), to prepare a forming raw material. A mass of metal silicon is preferably from 10 to 30 mass % of a total of a mass of silicon carbide powder and the mass of metal silicon. An average particle diameter of silicon carbide particles in the silicon carbide powder is preferably from 3 to 40 μm, and further preferably 10 to 35 μm. An average particle diameter of metal silicon (the metal silicon) is preferably from 2 to 20 μm. When the diameter is smaller than 2 μm, a volume resistivity becomes excessively small sometimes. When the diameter is larger than 20 μm, the volume resistivity becomes excessively large sometimes. The average particle diameters of the silicon carbide particles and metal silicon (metal silicon particles) are values measured by a laser diffraction method. The silicon carbide particles are fine particles of silicon carbide constituting the silicon carbide powder, and the metal silicon particles are fine particles of metal silicon constituting the metal silicon powder. A total mass of the silicon carbide particles and metal silicon is preferably from 30 to 78 mass % of a total mass of the forming raw material.

Examples of the binder can include methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the binder is preferably from 2 to 10 mass % of the whole forming raw material.

A content of the water is preferably from 20 to 60 mass % of the whole forming raw material.

As the surfactant, ethylene glycol, dextrin, fatty acid soap, polyalcohol or the like can be used. One of these surfactants May be used alone, or two or more thereof may be combined and used. A content of the surfactant is preferably 2 mass % or smaller with respect to the whole forming raw material.

There are not any special restrictions on the pore former, as long as the pore former becomes pores after fired. Examples of the pore former can include graphite, starch, resin balloon, water-absorbing resin, and silica gel. A content of the pore former is preferably 10 mass % or smaller with respect to the whole forming raw material. An average particle diameter of the pore former is preferably from 10 to 30 μm. When the diameter is smaller than 10 μm, the pores cannot sufficiently be formed sometimes. When the diameter is larger than 30 μm, a die is clogged sometimes at the time of forming. The average particle diameter of the pore former is a value measured by a laser diffraction method.

Next, the forming raw material is kneaded to form a kneaded material. There are not any special restrictions on a method of kneading the forming raw material to form the kneaded material, and examples of the method can include methods using a kneader, a vacuum clay kneader and the like.

Next, the kneaded material is extruded to form a honeycomb formed body. During the extrusion forming, a die having a desirable whole shape, cell shape, partition wall thickness and cell density, and the like is preferably used. As a material of the die, a hard metal which does not easily wear is preferable. The honeycomb formed body is a structure including porous partition walls to divide and form a plurality of cells which become through channels of a fluid and an outer peripheral wall positioned in an outermost periphery.

A partition wall thickness, cell density, outer peripheral wall thickness and the like of the honeycomb formed body can suitably be determined by taking, into consideration, contractions in drying and firing, in accordance with a configuration of the honeycomb structure of the present invention to be prepared.

The obtained honeycomb formed body is preferably dried prior to the firing. There are not any special restrictions on a drying method, and examples of the method can include electromagnetic heating systems such as microwave heating drying and high-frequency dielectric heating drying, and external heating systems such as hot air drying and overheat water vapor drying. Among these methods, for the reason that the whole formed body can quickly and uniformly be dried so that cracks are not generated, a predetermined amount of water content is dried by the electromagnetic heating system, and then the remaining water content is preferably dried by the external heating system. As drying conditions, a water content of 30 to 99 mass % is removed from an amount of the water content prior to the drying, by the electromagnetic heating system, and then the water content becomes 3 mass % or smaller by the external heating system. As the electromagnetic heating system, the dielectric heating drying is preferable, and as the external heating system, the hot air drying is preferable.

Next, when a length of the honeycomb formed body in a central axis direction is not a desirable length, both end surfaces (both ends) are preferably cut in the desirable length. There are not any special restrictions on a cutting method, but examples of the method can include methods using a circular saw cutter and the like.

Next, the honeycomb formed body is preferably fired to prepare the honeycomb structure 100 shown in FIG. 1 and FIG. 2. Prior to the firing, calcinating is preferably carried out, to remove the binder or the like. The calcinating is preferably carried out in the atmospheric air at 400 to 500° C. for 0.5 to 20 hours. There are not any special restrictions on calcinating and firing methods, and the body can be fired by use of an electric furnace, a gas preferably heated in an inactive atmosphere of nitrogen, argon or the like at 1400 to 1500° C. for one to 20 hours. Further after the firing, for the enhancement of a durability, an oxidation treatment is preferably carried out at 1200 to 1350° C. for one to ten hours.

EXAMPLES

Hereinafter, the present invention will further specifically be described with respect to examples, but the present invention is not limited to these examples.

Example 1

As a ceramic raw material, silicon carbide (SiC) powder and metal silicon (Si) powder were mixed at a mass rate of 80:20. To this material, strontium carbonate as a sintering aid, hydroxypropyl methylcellulose as a binder and a water-absorbing resin as a pore former were added, and water was added, to obtain a forming raw material. The forming raw material was kneaded, to prepare a columnar kneaded material by a vacuum clay kneader. A content of the binder was 7 mass % of a total of the silicon carbide (SiC) powder and the metal silicon (Si) powder, and a content of strontium carbonate was 1 mass % of the total of the silicon carbide (SiC) powder and the metal silicon (Si) powder. A content of the pore former was 3 mass % of the total of the silicon carbide (SiC) powder and the metal silicon (Si) powder, and a content of the water was 42 mass % of the total of the silicon carbide (SiC) powder and the metal silicon (Si) powder. An average particle diameter of the silicon carbide powder was 20 μm and an average particle diameter of the metal silicon powder was 6 μm. Moreover, an average particle diameter of the pore former was 20 μm. The average particle diameters of silicon carbide, metal silicon and the pore former were values measured by a laser diffraction method.

The obtained columnar kneaded material was extruded by using an extrusion-former, to obtain a honeycomb formed body. The obtained honeycomb formed body was dried by high-frequency dielectric heating, and then dried at 120° C. for two hours by use of a hot air drier, and both end surfaces were cut by a predetermined amount.

The obtained honeycomb formed body was degreased at 550° C. for three hours by use of an atmospheric furnace with a deodorizing device in the atmospheric air. Afterward, the body was fired in an Ar inactive atmosphere at about 1450° C. for two hours, and was further subjected to an oxidation treatment at 1300° C. for one hour. A porous honeycomb structure was obtained in which SiC crystal particles were bound with Si.

The obtained honeycomb structure had an average pore diameter of 8.6 μm, and a porosity of 45%. The average pore diameter and the porosity were values measured by a mercury porosimeter. Moreover, the honeycomb structure had a partition wall thickness of 90 μm, and a cell density of 90 cells/cm². Furthermore, a bottom surface of the honeycomb structure had a circular shape with a diameter of 93 mm, and a length of the honeycomb structure in a cell extending direction was 100 mm. Moreover, an isostatic strength of the obtained honeycomb structure was 2.5 MPa. The isostatic strength is a breaking strength measured by applying a hydrostatic pressure into water.

As to the obtained honeycomb structure, "a volume resistivity at 400° C. (the volume resistivity)", "an electric resistance of the honeycomb structure (the support electric resistance)", "a current value stability" and "a pressure loss" were obtained by the following methods. The results are shown in Table 1. In Table 1, "A" of the column of "the current value stability" indicates that a current flowed stably at 30 to 100 A. Moreover, "B" indicates that the current became "20 A or larger and smaller than 30 A" or "over 100 A and 700 A or smaller" sometimes. Moreover, "C" indicates that the current became "smaller than 20 A" or "over 700 A" sometimes, and was very unstable. A and B passed, and C did not pass. Further in Table 1, "A" of the column of "the pressure loss" indicates an open area ratio of 80% or larger. Moreover, "B" indicates an open area ratio smaller than 80%.

(Volume Resistivity)

A test piece of the same material as the honeycomb structure and of 10 mm×10 mm×50 mm was prepared. The whole surfaces of both ends were coated with a silver paste, and wired so that electricity could be conducted. The test piece was connected to a voltage applying current measuring device to apply a voltage. A thermocouple was installed at the center of the test piece, and a change of a test piece temperature with the elapse of time during the applying of the voltage was confirmed with a recorder. 100 to 200 V was applied. A volume resistivity was calculated from a value of the current which flowed when the test piece temperature reached 400° C., a voltage value, and a test piece dimension.

(Support Electric Resistance)

A side surface of the honeycomb structure (the support) having a bottom surface (an end surface) of a circular shape with a diameter of 93 mm, and having a length of 100 mm in the cell extending direction was coated with the silver paste, and wired so that the electricity could be conducted. The support was connected to the voltage applying current measuring device to apply the voltage. The thermocouple was used to measure a temperature distribution in the support when 600 V was applied (temperatures of 39 portions in the honeycomb structure were equally measured). A support electric resistance was calculated from a value of the current which flowed when an average temperature in the support became 400° C., and a voltage value.

(Current Value Stability)

In the same manner as in the above test of "the support electric resistance", 600 V was applied, and a value of the current which flowed when the average temperature in the support became 400° C. was measured.

(Pressure Loss)

A pressure loss of the honeycomb structure was evaluated by an open area ratio of a cross section of the honeycomb structure. The open area ratio was a ratio of "a total area of cells (openings)" in the cross section orthogonal to "the cell extending direction" of the honeycomb structure with respect to a sectional area (an area of the cross section orthogonal to the cell extending direction) of the honeycomb structure.

TABLE 1

|  | SiC ave. particle dia. (μm) | SiC blend amount (mass %) | Si ave. particle dia. (μm) | Si blend amount (mass %) | Pore former ave. particle dia. (μm) | Pore former blend amount (mass %) | Water (mass %) | Porosity (%) | Pore dia. (μm) |
|---|---|---|---|---|---|---|---|---|---|
| Example 1 | 20 | 80 | 6 | 20 | 20 | 3 | 42 | 45 | 8.6 |
| Example 2 | 15 | 80 | 6 | 20 | 20 | 3 | 42 | 47 | 7.4 |
| Example 3 | 10 | 80 | 6 | 20 | 20 | 3 | 42 | 48 | 6.3 |

TABLE 1-continued

| | | | | | | | | | |
|---|---|---|---|---|---|---|---|---|---|
| Example 4 | 8 | 80 | 6 | 20 | 20 | 3 | 42 | 49 | 5.2 |
| Example 5 | 5 | 80 | 6 | 20 | 20 | 3 | 42 | 50 | 3.9 |
| Example 6 | 3 | 80 | 6 | 20 | 20 | 3 | 42 | 50 | 2.3 |
| Example 7 | 10 | 90 | 6 | 10 | 20 | 3 | 42 | 52 | 5.5 |
| Example 8 | 10 | 70 | 6 | 30 | 20 | 3 | 42 | 45 | 7.2 |
| Example 9 | 10 | 60 | 6 | 40 | 20 | 3 | 42 | 42 | 8.4 |
| Example 10 | 20 | 60 | 20 | 40 | 20 | 0 | 22 | 35 | 9.6 |
| Example 11 | 10 | 80 | 6 | 20 | 20 | 1 | 30 | 40 | 5.7 |
| Example 12 | 10 | 80 | 6 | 20 | 20 | 5 | 54 | 60 | 8.7 |
| Example 13 | 10 | 80 | 12 | 20 | 20 | 3 | 42 | 46 | 7.6 |
| Example 14 | 20 | 80 | 20 | 20 | 20 | 3 | 42 | 42 | 10.0 |
| Example 16 | 5 | 80 | 2 | 20 | 10 | 3 | 42 | 53 | 3.5 |
| Example 17 | 30 | 80 | 20 | 20 | 30 | 3 | 42 | 42 | 14.0 |
| Example 18 | 10 | 80 | 6 | 20 | 20 | 3 | 42 | 48 | 5.9 |
| Example 19 | 8 | 80 | 6 | 20 | 20 | 3 | 42 | 49 | 5.2 |
| Example 20 | 20 | 70 | 6 | 30 | 20 | 2 | 36 | 37 | 9.2 |
| Example 21 | 20 | 70 | 6 | 30 | 20 | 2 | 36 | 37 | 9.2 |
| Example 22 | 40 | 80 | 6 | 20 | 20 | 3 | 42 | 38 | 19.8 |
| Example 23 | 20 | 70 | 6 | 30 | 20 | 0 | 22 | 30 | 12.6 |
| Comparative Example 1 | 52 | 80 | 6 | 20 | 30 | 3 | 42 | 40 | 12.3 |
| Comparative Example 2 | 1 | 80 | 6 | 20 | 30 | 3 | 42 | 56 | 1.5 |

| | Rib thickness (μm) | Cell No. (cells/cm²) | Cell shape | volume resistivity (Ω cm) | Support electric resistance (Ω) | Current value stability | Pressure loss |
|---|---|---|---|---|---|---|---|
| Example 1 | 90 | 90 | Quadrangular | 3.6 | 2.0 | B | A |
| Example 2 | 90 | 90 | Quadrangular | 7.4 | 3.9 | A | A |
| Example 3 | 90 | 90 | Quadrangular | 10.2 | 5.4 | A | A |
| Example 4 | 90 | 90 | Quadrangular | 16.6 | 8.6 | A | A |
| Example 5 | 90 | 90 | Quadrangular | 25.0 | 13.1 | A | A |
| Example 6 | 90 | 90 | Quadrangular | 38.4 | 18.9 | A | A |
| Example 7 | 90 | 90 | Quadrangular | 14.0 | 6.7 | A | A |
| Example 8 | 90 | 90 | Quadrangular | 4.6 | 2.6 | B | A |
| Example 9 | 90 | 90 | Quadrangular | 2.8 | 1.4 | B | A |
| Example 10 | 90 | 90 | Quadrangular | 2.4 | 1.3 | B | A |
| Example 11 | 90 | 90 | Quadrangular | 9.2 | 5.1 | A | A |
| Example 12 | 90 | 90 | Quadrangular | 22.2 | 10.8 | A | A |
| Example 13 | 90 | 90 | Quadrangular | 9.4 | 5.3 | A | A |
| Example 14 | 90 | 90 | Quadrangular | 3.0 | 1.9 | B | A |
| Example 16 | 50 | 140 | Quadrangular | 31.2 | 14.8 | A | A |
| Example 17 | 150 | 60 | Quadrangular | 2.6 | 1.2 | B | B |
| Example 18 | 90 | 90 | Hexagonal | 10.2 | 6.7 | A | A |
| Example 19 | 60 | 115 | Hexagonal | 16.6 | 9.5 | A | A |
| Example 20 | 130 | 90 | Quadrangular | 2.3 | 1.5 | B | B |
| Example 21 | 200 | 90 | Quadrangular | 2.3 | 1.1 | B | B |
| Example 22 | 130 | 90 | Quadrangular | 2.1 | 1.1 | B | B |
| Example 23 | 90 | 90 | Quadrangular | 1.3 | 1.0 | B | A |
| Comparative Example 1 | 90 | 90 | Quadrangular | 0.8 | 0.5 | C | A |
| Comparative Example 2 | 90 | 90 | Quadrangular | 76.0 | 37.5 | C | A |

Examples 2 to 23 and Comparative Examples 1 and 2

Honeycomb structures were prepared in the same manner as in Example 1 except that "an SiC average particle diameter (μm)", "an SiC blend amount (mass %)", "an Si average particle diameter (μm)", "an Si blend amount (mass %)", "a pore former average particle diameter (μm)", "a pore former content (the pore former) (mass %)", "a water content (the water) (mass %)", "porosities of partition walls (the porosity) (%)", "an average pore diameter of the partition walls (the average pore diameter) (μm)", "a partition wall thickness (μm)", "a cell density (cells/cm²)" and "a cell shape" were changed as shown in Table 1. In the same manner as in Example 1, "a volume resistivity of the honeycomb structure (the volume resistivity) (Ωcm)", "an electric resistance of the honeycomb structure (the support electric resistance) (Ω)", "a current value stability" and "a pressure loss" were measured. The results are shown in Table 1.

It is to be noted that "the SiC blend amount (mass %)" indicates a blend ratio of silicon carbide to a total mass of silicon carbide and metal silicon, and "the Si blend amount (mass %)" indicates a blend ratio of metal silicon to a total mass of silicon carbide and metal silicon. Moreover, "the pore former content (the pore former) (mass %)" indicates a blend ratio of the pore former to the whole forming raw material, and "the water content (the water) (mass %)" indicates a blend ratio of the water to the whole forming raw material. Furthermore, "a cell shape" indicates the cell shape in a cross section orthogonal to a cell extending direction.

It is seen from Table 1 that when the average particle diameter of silicon carbide is from 3 to 40 μm, the volume resistivity of the honeycomb structure becomes from 1 to 40 Ωcm. Moreover, if is seen that when the average particle diameter of silicon carbide is smaller than 3 μm, the volume resistivity of the honeycomb structure becomes excessively large. Furthermore, when the average particle diameter of silicon carbide is larger than 40 µm, the volume resistivity of the honeycomb structure becomes excessively small. Moreover, in the honeycomb structure of Comparative Example 1, the average particle diameter of silicon carbide was large, and hence a large number of defects were generated in the partition walls.

INDUSTRIAL APPLICABILITY

A honeycomb structure of the present invention can suitably be utilized as a support for a catalyst device which purifies an exhaust gas discharged from an internal combustion engine, in various fields of chemistry, power, iron and steel, and the like.

DESCRIPTION OF REFERENCE NUMERALS

1: partition wall, 2: cell, 3: outer peripheral wall, 4: honeycomb structure section, 11: one end surface, 12: the other end surface, and 100: honeycomb structure.

The invention claimed is:

1. A honeycomb structure comprising:
a honeycomb structure section including porous partition walls to divide and form a plurality of cells which extend from one end surface to the other end surface and become through channels of a fluid, and an outer peripheral wall positioned in an outermost periphery,
wherein the partition walls and the outer peripheral wall contain silicon carbide particles as an aggregate, and silicon as a binder to bind the silicon carbide particles,
thicknesses of the partition walls are from 50 to 200 µm, a cell density is from 50 to 150 cells/cm$^2$, an average particle diameter of the silicon carbide particles as the aggregate is from 3 to 40 µm, and a volume resistivity at 400° C. is from 1 to 40 Ωcm.

2. The honeycomb structure according to claim 1, wherein a ratio of a mass of silicon as the binder to a total of a mass of the silicon carbide particles as the aggregate and the mass of silicon as the binder is from 10 to 40 mass %.

3. The honeycomb structure according to claim 1, wherein porosities of the partition walls are from 30 to 60%, and an average pore diameter of the partition walls is from 2 to 20 µm.

4. The honeycomb structure according to claim 1, wherein an electric resistance at 400° C. is from 1 to 30 Ω.

5. The honeycomb structure according to claim 1, wherein the thicknesses of the partition walls are from 70 to 130 µm, the cell density is from 70 to 100 cells/cm$^2$, the porosities of the partition walls are from 35 to 45%, the average pore diameter of the partition walls is from 10 to 20 µm, the ratio of the mass of silicon as the binder to the total of the mass of the silicon carbide particles as the aggregate and the mass of silicon as the binder is from 15 to 35 mass %, and the volume resistivity at 400° C. is from 10 to 35 Ωcm.

6. The honeycomb structure according to claim 1, wherein a shape of the cells in a cross section orthogonal to an extending direction of the cells is a quadrangular shape or a hexagonal shape.

7. The honeycomb structure according to claim 2, wherein porosities of the partition walls are from 30 to 60%, and an average pore diameter of the partition walls is from 2 to 20 µm.

8. The honeycomb structure according to claim 7, wherein an electric resistance at 400° C. is from 1 to 30 Ω.

9. The honeycomb structure according to claim 3, wherein the thicknesses of the partition walls are from 70 to 130 µm, the cell density is from 70 to 100 cells/cm$^2$, the porosities of the partition walls are from 35 to 45%, the average pore diameter of the partition walls is from 10 to 20 µm, the ratio of the mass of silicon as the binder to the total of the mass of the silicon carbide particles as the aggregate and the mass of silicon as the binder is from 15 to 35 mass %, and the volume resistivity at 400° C. is from 10 to 35 Ωcm.

10. The honeycomb structure according to claim 4, wherein the thicknesses of the partition walls are from 70 to 130 µm, the cell density is from 70 to 100 cells/cm$^2$, the porosities of the partition walls are from 35 to 45%, the average pore diameter of the partition walls is from 10 to 20 µm, the ratio of the mass of silicon as the binder to the total of the mass of the silicon carbide particles as the aggregate and the mass of silicon as the binder is from 15 to 35 mass %, and the volume resistivity at 400° C. is from 10 to 35 Ωcm.

11. The honeycomb structure according to claim 8, wherein the thicknesses of the partition walls are from 70 to 130 µm, the cell density is from 70 to 100 cells/cm$^2$, the porosities of the partition walls are from 35 to 45%, the average pore diameter of the partition walls is from 10 to 20 µm, the ratio of the mass of silicon as the binder to the total of the mass of the silicon carbide particles as the aggregate and the mass of silicon as the binder is from 15 to 35 mass %, and the volume resistivity at 400° C. is from 10 to 35 Ωcm.

12. The honeycomb structure according to claim 3, wherein a shape of the cells in a cross section orthogonal to an extending direction of the cells is a quadrangular shape or a hexagonal shape.

13. The honeycomb structure according to claim 4, wherein a shape of the cells in a cross section orthogonal to an extending direction of the cells is a quadrangular shape or a hexagonal shape.

14. The honeycomb structure according to claim 9, wherein a shape of the cells in a cross section orthogonal to an extending direction of the cells is a quadrangular shape or a hexagonal shape.

15. The honeycomb structure according to claim 10, wherein a shape of the cells in a cross section orthogonal to an extending direction of the cells is a quadrangular shape or a hexagonal shape.

* * * * *